Nov. 6, 1923.

I. HILL ET AL 1,473,096

MACHINE FOR MAKING CELLULAR BOARD

Filed June 10, 1921    3 Sheets-Sheet 1

INVENTORS
Irving Hill
Poul A. Dinsmoor.
BY
ATTORNEY

Nov. 6, 1923.  1,473,096

I. HILL ET AL

MACHINE FOR MAKING CELLULAR BOARD

Filed June 10, 1921  3 Sheets-Sheet 3

INVENTORS
Irving Hill
Paul A Dinsmoor
BY
ATTORNEY

Patented Nov. 6, 1923.

1,473,096

UNITED STATES PATENT OFFICE.

IRVING HILL AND PAUL A. DINSMOOR, OF LAWRENCE, KANSAS, ASSIGNORS TO LAWRENCE PAPER MANUFACTURING COMPANY, OF LAWRENCE, KANSAS, A PARTNERSHIP COMPOSED OF M. G. BOWERSOX, IRVING HILL, PAUL A. DINSMOOR, HORTENSE B. HILL, MARY B. DINSMOOR, JEAN B. BLACKWELDER AND MARGERY B. DALTON.

MACHINE FOR MAKING CELLULAR BOARD.

Application filed June 10, 1921. Serial No. 476,468.

*To all whom it may concern:*

Be it known that we, IRVING HILL and PAUL A. DINSMOOR, citizens of the United States, residing at Lawrence, in the county of Douglas and State of Kansas, have invented certain new and useful Improvements in Machines for Making Cellular Board; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to corrugated or cellular board such as is employed for use in the manufacture of shipping boxes and the like.

The primary object of the invention is to provide cellular board made from sheets of maximum thickness so that the shipping box or product made therefrom will have considerably more strength than that made from ordinary corrugated or cellular board.

The use of cellular board, prior to our invention, has been restricted to some extent by the fact that, according to known methods, straw board from which the cellular or corrugated board is usually made could not be treated if it were thicker than .014 and the manufacturers of such board have generally agreed that this was the maximum thickness because when board of greater thickness was used, the fibers would break in the corrugating process and render the board unfit for use. Therefore, prior to our invention, relatively heavy straw board corrugated in sheets with normal corrugations was considered impossible.

We have discovered, however, that heavy board can be corrugated in the usual way if it is first treated so as to soften the fibers, which we term "tempering" and then pass the sheets so treated through complementary corrugating rolls, preferably having teeth so arranged and so spaced that there will be uniform sinuous spaces between the co-acting teeth of adjacent rolls between which the tempered sheets are passed so that symmetrical uniform corrugations will appear on the sheets after they have passed through the rolls.

In actual practice we have so treated board considerably thicker than .014 and have produced corrugated sheets therefrom in which the resultant product had all the appearance of corrugated board made from thinner sheets and in which the fibers were not broken or strained. In other words, the tensile strength of the fibers, due to corrugating the heavier board according to our invention, was not impaired.

In carrying out our invention we pass the straw board sheet through a chamber to which steam is supplied during the entire time that the sheet is passing therethrough, the chamber being full of steam and vapor so that the steam and vapor will act upon the fibers of the straw board to soften them, the condensate being allowed to precipitate and be drawn off so that only the steam and vapor will act on the board.

The novel arrangement of the preferred construction of our invention will be specifically described hereinafter, reference being had to the accompanying drawings, in which—

Figure 1:
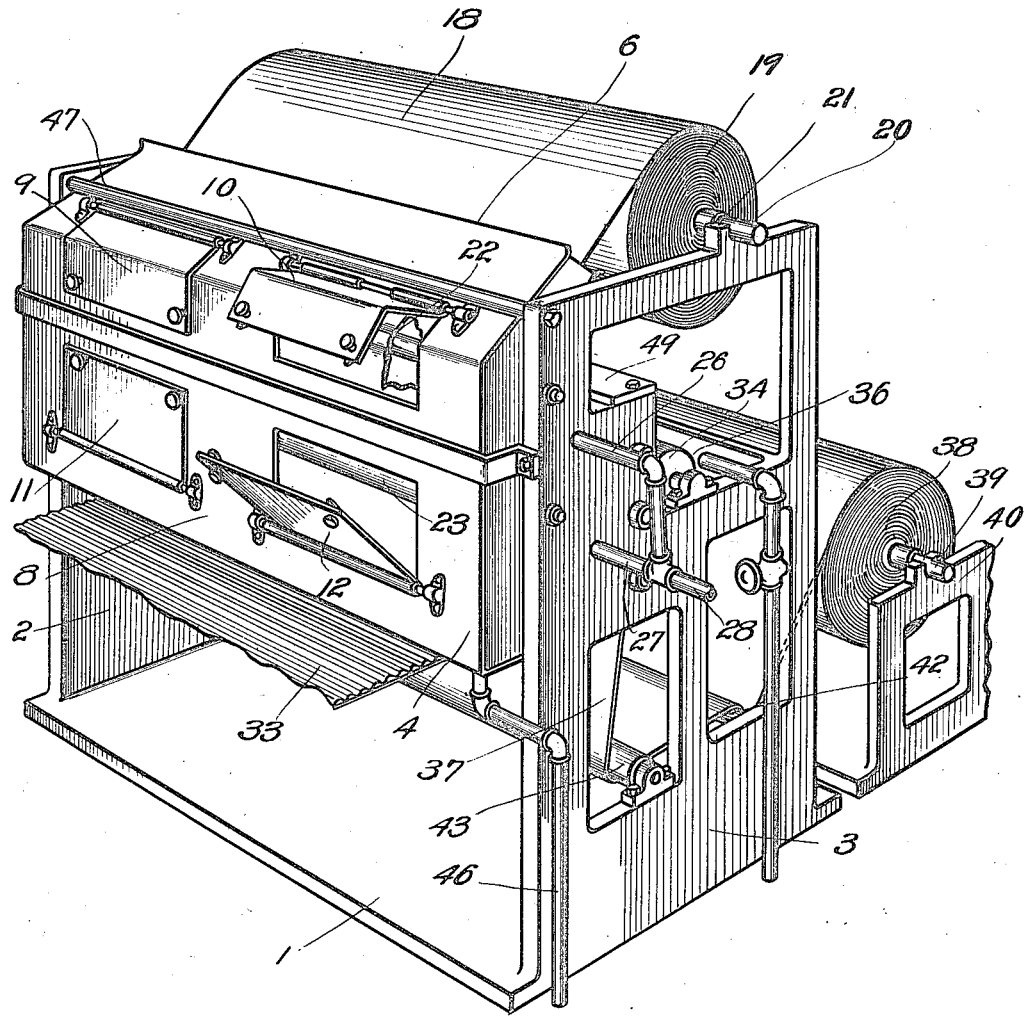
Fig. 1 is a perspective view of a tempering machine constructed in accordance with our invention.
Figure 2:
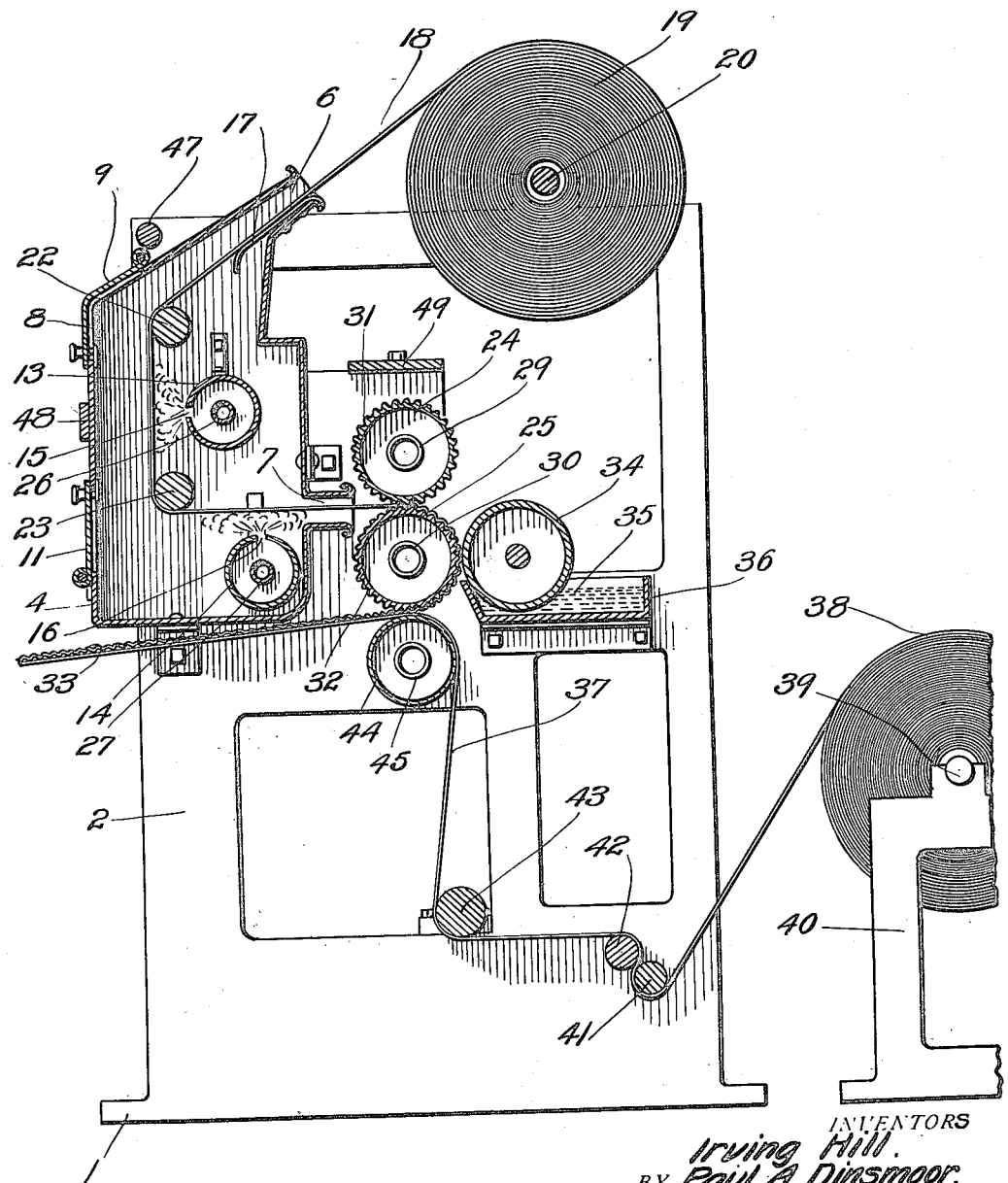
Fig. 2 is a cross sectional view through the machine.
Figure 3:
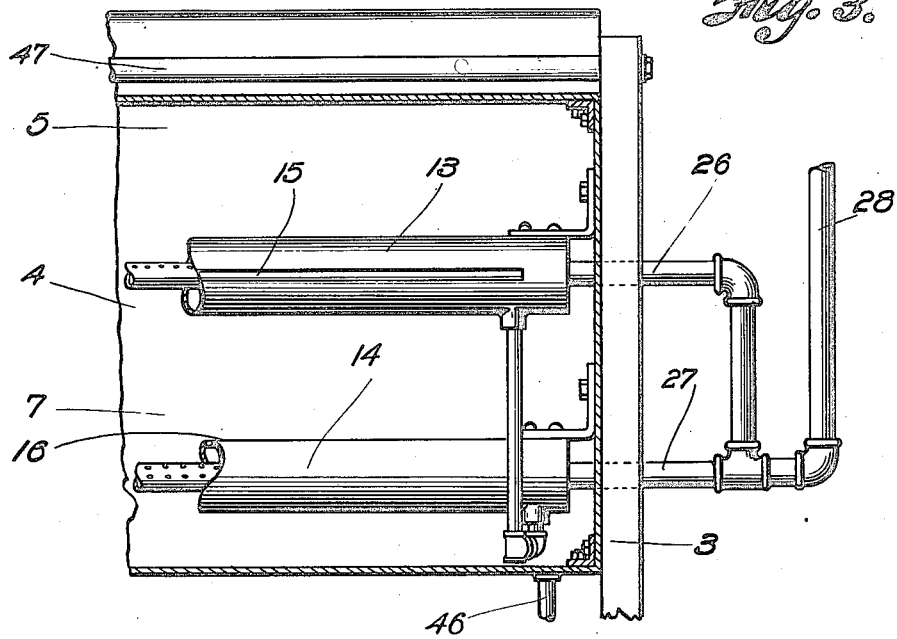
Fig. 3 is an elevational view of the tempering drums or jackets.

The invention is shown as consisting of a base 1, at the ends of which are upstanding frame ends 2 and 3, which support a substantially rectangular tempering casing 4, forming a tempering chamber 5 having a laterally extending, board-receiving slot 6 at its upper end and a similarly formed, rearwardly discharging slot 7 near its lower end. The front plate 8 of the casing 4 may be provided with separate doors 9, 10, 11 and 12 whereby access to the interior of the casing may be had for inspection or repairs. The doors may be hinged in the usual way and be provided with means for holding them in closed position. The number of doors may be varied without affecting the functioning of our invention.

Within the chamber 5 and extending practically across said chamber are tempering drums or jackets 13 and 14, the former being provided with a horizontally discharging slot 15 and the latter with a top or upwardly discharging slot 16. Fastened to the neck portion 6 of the casing 4 is a sheet supporting plate 17, over which the straw board 18 may pass as it is unwound from the roll 19 on the mandrel 20, supported in the bearings 21 on the end frame members 2 and 3.

Spaced above and slightly in advance of the slot 15 is a guide and supporting roller 22, over which the straw board passes after it leaves the plate 17 and in line with the roller 22 is a complementary guide roller 23, below the tempering jacket or cylinder 13 and above the jacket 14 and its slot 16, the bottom edge of the roller being in line with the discharge slot 7 and in line with the meeting portions of the mating corrugators or rollers 24 and 25, between which the straw board is fed as it passes from the tempering chamber.

The tempering jackets 13 and 14 may be supplied with steam by the pipes 26 and 27, which, in turn, are supplied with steam from a suitable source connected to the pipe 28.

Figure 4:
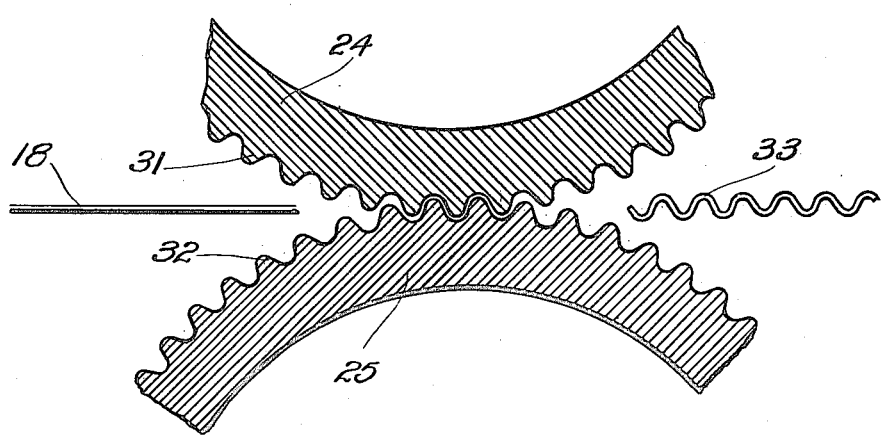
Fig. 4 is an enlarged detail sectional view of parts of the corrugators or rolls.
Figure 5:
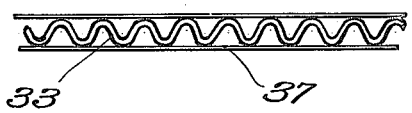
Fig. 5 is an end view of part of the finished product.

The corrugators or rollers 24 and 25 are preferably hollow and they may be heated from a suitable source of supply through pipes 29 and 30. The ribs 31 and 32 on the perimeters of the corrugators run longitudinally thereof, those on one roll mating with those on the complementary roll so that when the sheet is fed between them, they will flute or corrugate the sheet, as indicated at 33, Fig. 4. The fluted or corrugated sheet, then passes between one of the corrugating rollers and an adhesive transfer roll 34, which is shown to be adjacent to the lower roll 25 and which has its lower portion immersed in an adhesive indicated at 35 and contained in a vat or pan 36. The adhesive may consist of sodium silicate or water glass, it being obvious, however, that any other suitable adhesive may be used.

The corrugating rollers 24 and 25 are provided with especially shaped teeth so generated that there will be a symmetrical uniform sinuous space between co-operating teeth through which the board passes and since the space between the co-operating teeth is of uniform thickness, it will be apparent that the board will be uniformly corrugated and that various thicknesses of board may be taken care of by regulating the distance between the teeth.

After the corrugated or fluted sheet has passed from contact with the adhesive transferring roll 34 with the edges of the corrugations containing the adhesive, it comes into contact with a liner or cover sheet 37, fed from the roll 38 on a mandrel 39, carried by the frome 40. The sheet 37 may pass from the roll 38 under a tensioning roller 41 and between it and a complementary tensioning roller 42, over which it passes to the guide roller 43 supported in the end frames 2 and 3, under the guide roller 43 and over a heated roller 44, which may be heated through the medium of the steam pipe 45, as will be well understood.

The corrugating roller 25 and the heated roller 44 act as pasting or presser rollers between which the fluted or corrugated sheet 33 and the liner or cover sheet 37 may pass so that they will be caused to adhere. They may then pass through a double facing machine of any type where the second liner is applied, or the second liner may be applied on the same unit, or a single line board may be made and the two units used. The board is then either wound into rolls or passed through a cutting device and cut into sheets. These latter features, however, are not inherent parts of our invention.

If desired, a condensate relief pipe 46 may be provided for the casing 4 so as to draw off accumulated moisture in the bottom thereof.

The two end frame members 2 and 3 may be tied together by suitable means as, for example, a tie bar 47 and the strap bar 48, which helps to support the casing 4. A tie plate 49 may also be employed for connecting the intermediate portions of the two end frame members 2 and 3 together, if desired.

It will be apparent by reference to the drawings that the sheet to be corrugated, usually straw board, can be fed into the tempering chamber, over the rollers 22 and 23, and past the tempering drums or jackets 13 and 14, to be subjected to the action of steam to soften the fibers so that the corrugated rollers can act upon it. The steam issuing from the jacket 13 will act on one side of the sheet and the steam issuing from the jacket 14 will act on the opposite side or surface of the sheet so that the fibers will be sufficiently softened by the time they have reached the corrugating rollers. Therefore, the sheet will have a fluted appearance because it will follow the form of the spacing between mating teeth and the fluting can be accomplished without liability of breaking or unduly stretching the fibers so that the inherent tenacity or tensile strength of the fibers will not be impaired.

Varying thicknesses of board may be treated in the same machine by varying the spacing from the meeting teeth of the rolls 24 and 25.

It will also be apparent that the liner or cover sheet can readily be applied to the fluted or corrugated board to complete the finished product known commercially as corrugated board.

The rollers 41 and 42 provide the necessary tension to maintain the sheet 37 taut without offering too much resistance thereto.

It is also apparent that, if desired, the fluted or corrugated sheet may be passed between a double line of cover sheets, one on each surface.

What we claim and desire to secure by Letters Patent is:

A machine for making cellular board, comprising a tempering chamber having an inlet opening and an outlet opening, vertically spaced rollers for guiding a sheet through the chamber, means for delivering steam horizontally against one face of the sheet during passage of the sheet between the vertically spaced rollers, means for delivering steam vertically against the opposite face of the sheet after its passage over said rollers, and a pair of corrugating rollers for receiving the sheet between them after its delivery through the outlet opening.

In testimony whereof we affix our signatures.

IRVING HILL.
PAUL A. DINSMOOR.